(12) United States Patent
Rupp

(10) Patent No.: US 7,269,616 B2
(45) Date of Patent: Sep. 11, 2007

(54) TRANSITIVE PROCESSING UNIT FOR PERFORMING COMPLEX OPERATIONS

(75) Inventor: Charle' R. Rupp, Morgan Hill, CA (US)

(73) Assignee: Stretch, Inc., Sunnyvale, CA (US)

( * ) Notice: Subject to any disclaimer, the term of this patent is extended or adjusted under 35 U.S.C. 154(b) by 816 days.

(21) Appl. No.: 10/394,824

(22) Filed: Mar. 21, 2003

(65) Prior Publication Data

US 2004/0186872 A1 Sep. 23, 2004

(51) Int. Cl.
*G06F 7/52* (2006.01)
*G06F 7/38* (2006.01)

(52) U.S. Cl. ...................... 708/625; 708/230
(58) Field of Classification Search ............. 708/620, 708/625, 626, 230, 232
See application file for complete search history.

(56) References Cited

U.S. PATENT DOCUMENTS

| 4,130,878 | A | * | 12/1978 | Balph et al. ............. 708/626 |
| 4,811,270 | A | * | 3/1989 | Nash ...................... 708/630 |
| 4,825,401 | A | * | 4/1989 | Ikumi .................... 708/630 |
| 5,535,406 | A | | 7/1996 | Kolchinsky |
| 5,956,518 | A | | 9/1999 | DeHon et al. |
| 5,999,734 | A | | 12/1999 | Willis et al. |
| 6,092,174 | A | | 7/2000 | Roussakov |
| 6,622,233 | B1 | | 9/2003 | Gilson |
| 2004/0019765 | A1 | | 1/2004 | Klein, Jr. |

OTHER PUBLICATIONS

Beeck et al., "CRISP: A Template for Reconfigurable Instruction Set Processors," FPL 2001, LNCS 2147, pp. 296-305, Springer-Verlag Berlin Heidelberg, 2001.

* cited by examiner

*Primary Examiner*—Chuong D. Ngo
(74) *Attorney, Agent, or Firm*—Carr & Ferrell LLP

(57) ABSTRACT

The present invention provides a circuit for a programmable transitive processing unit for performing complex functions, such as multiplication, pipelining of one or more values, and/or shift operations, wherein the circuit can be configured to be a constituent of an array of other similar circuits to form, for example, a larger multiplier.

47 Claims, 10 Drawing Sheets

TPU Functional Configuration Control Summary

| bits | Name | Description |
|---|---|---|
| 0 | DELAY | Use TPU as a delay chain instead of arithmetic element |
| 1 | SHIFT | Enable arithmetic shift operation: XVALUE = (1 << X) |
| 2 | YCON | Use K configuration bits as a constant Y input |
| 6:4 | SP | Shift position: set this value to indicate horizontal TPU number |
| 8 | CNTR | Continue Right: set this bit if TPU on right is in this array |
| 9 | CNTT | Continue Top: set this bit if TPU above is in this array |
| 10 | CNTL | Continue Left: set this bit if TPU on left is in this array |
| 11 | XPIPE | Enable pipeline register for PTX output to TPU below |
| 12 | XSGND | This TPU contains the MSB of X which is treated as a two's complement form |
| 13 | YSGND | This TPU contains the MSB of Y which is treated as a two's complement form |
| 14 | BPIPE | Enable pipeline register for PB output to TPU below or result value |
| 15 | RPIPE | Enable pipeline register for DR output to TPU to the right or result value |
| 19:16 | K | Constant used for Y bits when YCON is enabled |
| 23:20 | PSEL | Output Pipeline select: select number of delay steps for DR output |
| 26:24 | YSEL | Y operand pipeline select: pipeline stage number vertically |
| 30 | RND0 | Add constant 1 to the LSB of the result for rounding |
| 31 | RND3 | Add constant 1 to bit-3 of the result for rounding |

FIG. 5

TRANSITIVE PROCESSING UNIT FOR PERFORMING COMPLEX OPERATIONS

BACKGROUND

1. Field of the Invention

The present invention relates generally to configurable processor systems, and more particularly to programmable transitive processing units ("TPUs") for performing complex functions.

2. Background

Digital signal processing (DSP), encryption and other complex functions require high levels of computational power to perform the underlying intricate arithmetic operations. To improve the functionality and performance of processing such complex functions, programmable embedded systems have been implemented in electronic devices designed for specific applications. Some of these programmable embedded systems include Field Programmable Gate Array (FPGA) technology to provide programmable functions. FGPAs generally include a basic standard-cell logic disposed in a programmable array structure. FPGAs, however, are designed to be universally used in a multitude of applications and thus comprise many logic gates, such as from 400,000 to 1.5 million (or more) gates, for adaptation to a specific application. But in most applications, the large amounts of programmable logic of the FPGAs go unused and effectively become wasted.

A unique approach to providing for programmable embedded systems that minimizes unused programmable functionalities, among other things, uses one or more configurable arithmetic logic units (CALUs) disposed in rows and columns of a programmable logic array. Because CALUs provide scalable (i.e., configurable) functionality in terms of circuitry and routing resources, the programmable logic arrays having CALUs are referred to as a multi-scale programmable logic arrays (MSAs). The programmable logic core of an MSA is a programmable logic fabric that can be customized to implement any digital circuit after fabrication of, for example, a System on a Programmable Chip (SOPC). The programmable logic fabric consists of any number of uncommitted gates and programmable interconnects between these gates so that they can be later programmed to perform specific functions. An MSA architecture allows digital logic to be designed and programmed using both small-scale block (e.g., gate level blocks) and/or medium scale block (e.g., Register Transfer Level, or "RTL," blocks) techniques.

In an MSA architecture optimized for simple arithmetic operations, such as binary addition, subtraction, Boolean logic functions, etc., the CALUs can provide results expeditiously. The CALUs, however, are typically not optimized to quickly perform complex functions such as multiplication, shift operations or other sophisticated arithmetic operations.

Thus, there is a need for a circuit and a method for executing complex functions that overcome the drawbacks of conventional approaches of providing for configurable processing capabilities.

SUMMARY OF THE INVENTION

The present invention provides a circuit for a programmable transitive processing unit and a method for performing complex functions. A "transitive" processing unit and its circuit refers to its ability, in some embodiments, to generate a result, which depends on each input bit of one or more operands. In one embodiment, a transitive processing unit ("TPU") circuit functions as a part of an array of TPU circuits, the TPU circuit comprising a multiplier circuit including a first operand input for receiving a portion of a first operand. The multiplier circuit also includes a second operand input for receiving a portion of a second operand. The multiplier circuit further is configured to receive a portion of a left-immediate result generated by a left-TPU circuit to the left of the TPU circuit if present in the array. Moreover, the multiplier circuit receives a portion of an above-partial product from an above-TPU circuit above the TPU circuit if present in the array. Finally, the multiplier circuit generates a portion of an immediate result and a portion of a partial product. An exemplary TPU also includes a pipeline circuit configured to store a first operand input and a second operand input to generate the portion of the immediate result and the portion of a partial product at a specific point in time.

BRIEF DESCRIPTION OF THE DRAWINGS

FIG. 5 is a table describing control signals for configuring an exemplary TPU in accordance with a specific embodiment.

DESCRIPTION OF THE SPECIFIC EMBODIMENTS

Figure 1:
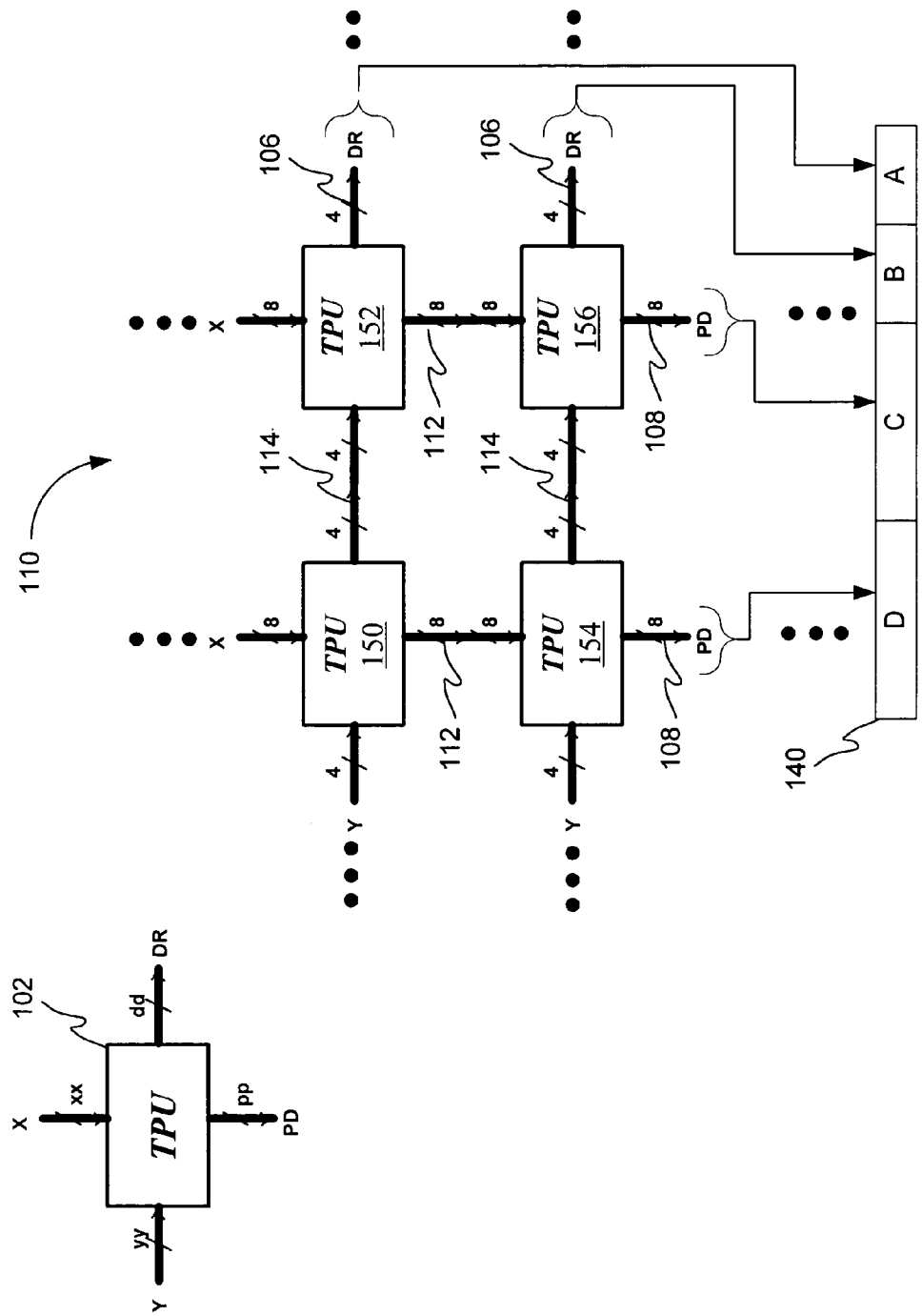
FIG. 1 is a block diagram of an exemplary transitive processing unit ("TPU") and an array of TPUs in accordance with an embodiment of the present invention.

As shown in the exemplary drawings wherein like reference numerals indicate like or corresponding elements among the figures, exemplary embodiments of a system and method according to the present invention are described below in detail. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

FIG. 1 shows a simple block diagram depicting inputs and outputs of TPU 102 in accordance with a specific embodiment of the present invention. In this example, TPU 102 receives on inputs X (i.e., X operand) and Y (i.e., Y operand) and generates outputs PD (abbreviation representing product data in some applications) and DR (abbreviation representing data register in some applications), where the operation of TPU 102 is configurable. As shown, the X operand, Y operand, PD and DR are xx, yy, pp and dd bits wide, respectively. In one embodiment, the X operand is a multiplicand and the Y operand is a multiplier when TPU 102 is configured to operate as a multiplier circuit.

TPU 102 can be configured as a multiplier to determine the product between the X operand Y operand. If xx is 8 bits and yy is 4 bits, then the product is 12 bits. In this example, the upper bits (e.g., 8 bits) of the product is output from the TPU at PD, and the lower bits (e.g., 4 bits) of the product is output from the TPU at DR. To multiply larger numbers, additional TPUs 104 can be coupled to form a multiplier of TPU array 110. In this example, a 16-bit by 8-bit multiplier can be realized using two columns of TPUs with two TPUs in each column (i.e., two rows) in TPU array 100. As shown in FIG. 1, TPUs 150 and 154 form one column and TPUs 152 and 156 from the second column. The lower 8-bits of the 24-bit result are output from DR lines 106 (e.g., 4 bits per line) in the right column while the upper 16-bits of the result are output from PD lines 108 (e.g., 8 bits per line) from the bottom row.

In some embodiments, the intermediate values that are not part of the final result (i.e., partial product values) can be output onto DR lines 114 and PD lines 112 to other TPU blocks not shown in FIG. 1 via configurable interconnections (e.g., the programmable logic fabric in which the TPUs reside) between TPUs. One having ordinary skill in the art will appreciate that TPUs can be arranged into "rows" and "columns" either physically oriented on an integrated circuit or conceptually, or both. Although FIG. 1 shows four TPUs forming TPU array 110, fewer or more TPUs can be coupled to form a smaller or larger multiplier in accordance with the present invention.

In accordance with a specific embodiment, when an X operand has more than xx bits, the least significant bit(s) are input into a TPU in the top row and in the right column (e.g., TPU 152 of FIG. 1). The next most significant bit(s) are connected to the next column to the left (e.g., TPU 150) and so forth so that the most significant bit(s) of the X operand are connected to the left-most column. Given an X operand of 8 bits, for example, the most significant bit X(bit7) is input on the left-most side of TPU 102 and the least significant bit X(bit0) is input on the right-most side of TPU 102. If the number of bits in the X operand is not a multiple of xx (e.g., not a multiple of "8"), then the X operand is either sign extended with zero values for an unsigned operand or is signed extended with the most significant bit of X for a signed operand.

Similarly, the least significant bit(s) of the Y operand is applied to the top row of TPU array 110 with consecutive bits distributed to consecutive rows below. For example, if a Y operand is 8 bits wide and Y lines are 4 bits wide such as shown in FIG. 1, then Y(bits 7-4) are applied to the row including TPU 154 and Y(bits 3-0) are applied to the row including TPU 150. Further to this example, if the Y operand is not a multiple of yy bits (e.g., not a multiple of 4 bits), then the Y operand is either signed extended with zeros if Y operand is unsigned, or is signed extended with the most significant bit of Y for a signed operand to be a multiple of 4 bits. When TPU array 110 is employed as a multiplier, the Y operand input ("YIN") is applied to the rows of TPUs in TPU array 110 such that a YIN bit is applied to a specific row of TPUs. For example, YIN(bits 7-4) are typically applied to both TPUs 154 and 156 at or near the same time and YIN(bits 4-0) are typically applied to both TPUs 150 and 152 at or near the same time.

In another embodiment, the Y operand of TPU 102 can be configured as constant value input (i.e., "K"). Using a constant value eliminates the need for additional routing signals for the Y operand (or part of the Y operand). In some embodiments, the bits of Y operand can originate from different sources. For example, some bits of YIN can be a constant value, some bits can originate from Y operand, and/or some bits can originate from other TPUs (not shown), which can be physically remote from TPU array 110. As an example of other TPUs providing some bits of Y operand, these bits can result from another arithmetic operation performed in a remote TPU and then applied to TPU array 110 as part of Y operand. As another example, some bits of Y operand can be an output of a remote TPU configured to provide a delay chain function.

Result 140 of a multiplier formed from TPU array 110 is shown in FIG. 1 to include upper bits output from PD lines 108 and lower bits output from DR lines 106. The least significant bits associated with A and B of result 140 are output from DR lines 106 of TPU 152 and TPU 156, respectively. The most significant bits associated with C and D of result 140 are output from PR lines 108 (i.e., for immediate result bits) of TPU 156 and TPU 154, respectively. In short, the order of bit output of the upper bits of result 140 is top to bottom, with the least significant bit (i.e., Y(bit0)) at the top. This arrangement allows the least significant bits of the output to be folded back into a data path flow with the same alignment as the Y operand inputs.

As will be discussed below, TPU 102 is configured such that it can be combined with other TPUs to form an array of TPUs. When functioning as a part of a multiplier, each TPU is identified by its relative position in the array and is distinguishable from other TPUs if it is in the right-most column, the left-most column and/or the top-most row. The relative position of a TPU is defined, according to one embodiment, by a number of control bits that configure the TPU as being in the right-most column, the left-most column and/or the top-most row. Further, a TPU can be configured to accept either the X operand or Y operand, or both, as unsigned or signed numbers. A signed operand, for example, can be a "two's complement" representation of either a positive or negative integer number. In some embodiments, TPU 102 can be configured to provide, as will be discussed below, other functions such as pipelining, shifting, delay chaining, etc.

In accordance with a specific embodiment of the present invention, each TPU of TPU array 110 generates a partial product that, when summed together with the other partial products generated by the other TPUs of TPU array 110, produces result 140. TPUs 150 and 154 output the lower bits of their partial products out DR lines 114, whereas TPU 150 outputs the upper bits of its partial products out PD lines 112 and PTU 154 outputs the upper bits of its partial product, which here is part of the final result, out PD lines 108. Equation 1 illustrates how the multiplication of an X operand with a Y operand can be distributed across TPU array 110 to determine partial products.

$$P = X \cdot Y = [(XU \cdot 2^n) + XL] \cdot [(YU \cdot 2^m) + YL] = [(XU \cdot YU) \cdot 2^{n+m}] + [(XU \cdot YL) \cdot 2^n] + [(XL \cdot YU) \cdot 2^m] + (XL \cdot YL) \quad \text{Eqn. 1}$$

where "XU" and "XL" represent the portions of the upper bits and the lower bits, respectively, of the X operand, "YU" and "YL" represent the portions of upper bits and the lower bits, respectively, of the Y operand, "n" is the number of bits in the lower portion of the X operand and "m" is the number of bits in the lower portion of the Y operand. Hence, in this example TPU 150 yields partial product (XU·YL), which is equivalent to [(XU·YL)·$2^n$], TPU 152 yields partial product (XL·YL), TPU 154 yields partial product (XU·YU), which is equivalent to [(XU·YU)·$2^{n+m}$], and TPU 156 yields partial product (XL·YU), which is equivalent to [(XL·YU)·$2^m$]. Although other ways of ordering the bits of the operands (e.g., ordering the X operand input into TPUs from the least significant bit at left-most input to most significant bit at right-most input) are within the scope of the present invention, the exemplified order is well-suited for configuring TPU array 110 as a multiplier.

Because multiplicative results obtained by multiplying binary numbers together is a function of the upper bits of the result rather than the lower bits of the result, the lower bits of result 140 can be determined without additional processing. That is, the upper bits of the result only need be processed as necessary to, for example, correct for signed operand multiplication. As will be shown below, only select TPUs of a TPU array comprising a multiplier need process the upper bits of the result. Further, because the lower bits of the result need not undergo further processing, the complexity of routing interconnects is decreased and the processing speed of a multiplier increases. One having ordinary skill in binary mathematics will appreciate the nature of binary number multiplication, especially in view of ring modulo mathematics.

In one embodiment, pipelining functionality of TPU 102 is implemented using one or more pipeline registers for temporally storing either or both of input and output values from, for example, a multiplier block of TPU 102. With such pipelining, large multipliers can be constructed so as to operate at relatively high speeds. The pipeline registers of TPU 102 can be used to resolve the intermediate results (e.g., partial products values) while accommodating different programmable register delays. By breaking up the multiplication in function in stages, which are pipelined, larger complex functions (e.g., larger multipliers) can be accomplished with high and/or uniform clock speeds without degrading accuracy of the results. In some cases, such pipeline registers can be used to provide for signed value correction. These and other pipelining functionalities are discussed below.

In another embodiment, TPU 102 can be configured to perform shift operations. In operation, TPU 102 uses the X operand as a component of a shift value input. TPU 102 converts this value to a multiplicative to shift the Y operand by the number of bit-positions represented by the X operand value. In yet another embodiment, TPU 102 can function as a programmable delay chain that, for example, can delay execution of an arithmetic logic operation. An example of such a delay involves delaying the addition of a first number until the product of a second and third number is determined. The input and output pipeline registers can be combined to form a programmable delay chain in accordance with a specific embodiment. In this case, the Y-operand input of TPU 102 forms the input to a delay chain while the DR-output of TPU 102 represents the output of the delay chain. In an exemplary circuit, TPU 102 can be programmed to implement any delay from one to eight clock steps. Circuits for performing shift and pipeline operations will be described below.

Figure 2:
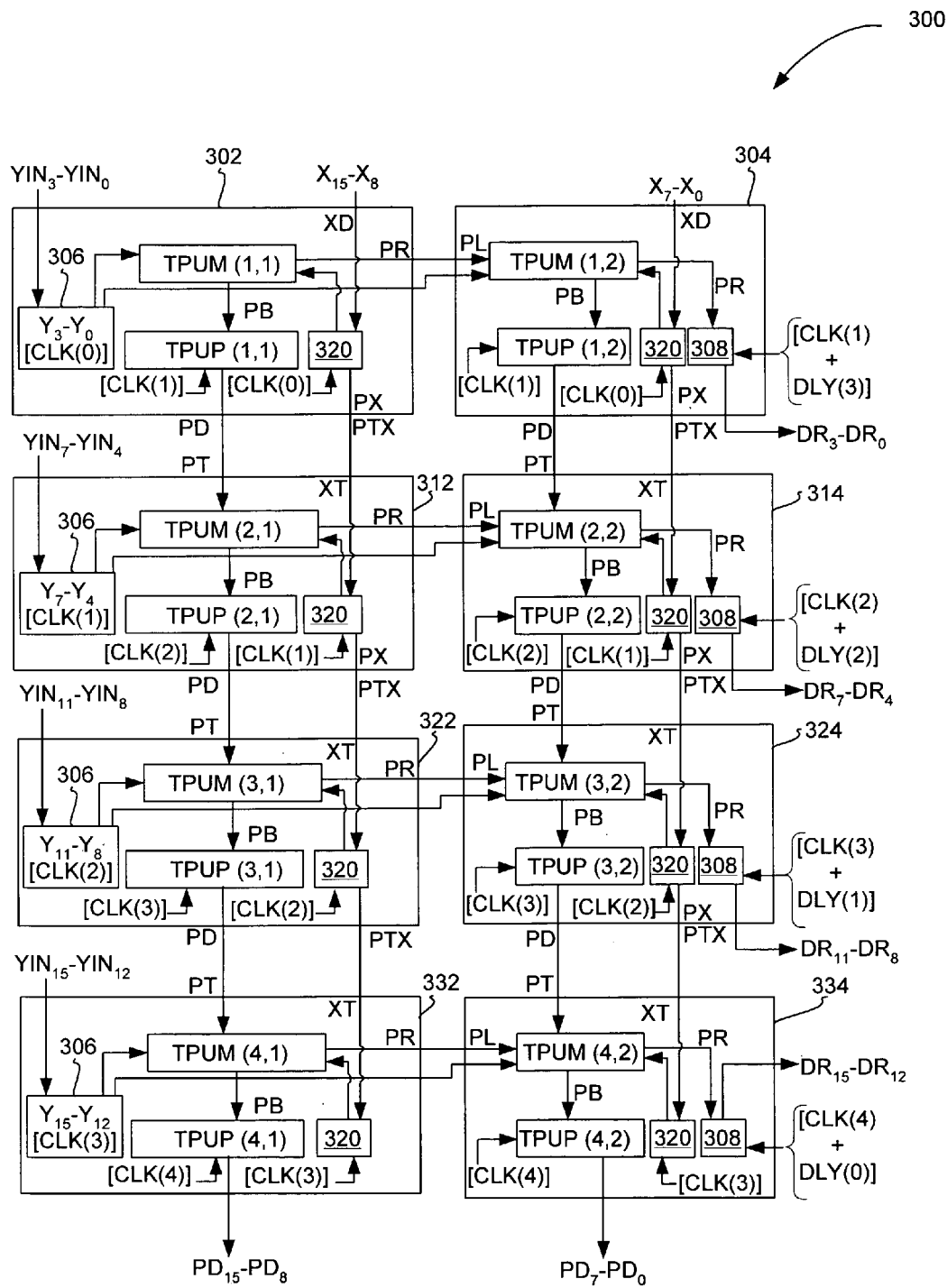
FIG. 2 is a block diagram of an exemplary multiplier composed of an array of TPUs in accordance with an embodiment of the present invention.

FIG. 2 depicts an exemplary 16-bit by 16-bit multiplier formed by an array of TPUs in accordance with a specific embodiment of the present invention. In this instance, eight TPUs 102 of FIG. 1 are programmed to be at least interconnected as shown in FIG. 2. The TPUs of FIG. 2 includes at least a TPU multiplier circuit ("TPUM") for generating a partial product and a TPU pipeline register circuit ("TPUP") for temporally storing partial products, among other things. For purposes of distinguishing between different TPUMs and TPUPs among the TPUs, each TPUM and TPUP is identified by row and column, such as TPUM(1,1) residing in TPU 302 and located at the intersection of the first row and the first column. The TPUs in the array, however, are not all functionally identical in this example. That is, they have been configured to operate uniquely to construct the 16-bit by 16-bit multiplier.

For example, TPUs 302 and 304 are each configured to directly receive 8 bits of the X operand via the respective XD lines of these TPUs. As shown, the X operand is applied to registers 320 within TPUs 302 and 304, respectively. In some embodiments, registers 320 of TPUs 302 and 304 are included in TPUPs (1,1) and (1,2), respectively. The other TPUs, however, are programmed to receive the upper bits of a partial product as well as a portion of the X operand, where these upper bits of the partial product is generated from a TPU in a previous row and are communicated via a set of PD lines to these other TPUs. For example, port PT of TPU 312 is coupled to port PD of TPU 302 to receive upper bits of a partial product from pipeline register TPUP(1,1), as generated by TPUM(1,1). Further, port XT of TPU 312 is coupled to port PTX of TPU 302 for receiving a part of the X operand (i.e., into port XD), where the X operand bits X(bit 15)-X(bit8) are temporally stored in register 320 of TPU 302. Hence, the upper bits of the partial product are propagated to TPUM (2,1) of TPU 312 when clocked at the first clock cycle ("CLK(1)"), whereas the X operand bits X(bit 15)-X(bit8) are propagated register 320 of TPU 312 at initial clock cycle CLK(0). The partial products and X operand bits are similarly communicated between TPUs 304 and 314 (as well as other the TPUs) via lines between ports PD and PT and ports PTX and XT. The discussion in connection with FIGS. 5-7 describe the ports (or lines) of a TPU, such as PTX and PD, and their corresponding functionality.

As another example, the TPUs in the left column are configured to have a clock delay in providing a portion of the Y operand to a TPUM. In another example, the TPUs in the right column are programmed to include a delay (i.e., "DLY(g)," where g is 0, 1, 2 or 3 and represents a pipeline stage) in outputting a lower portion of a partial product from an associated TPUM. Each of the TPUs in FIG. 2 can be configured and/or interconnected to perform other functions (not shown), some of which are described below.

As shown, the array of TPUs in FIG. 2 is configured to receive a 16-bit X operand; top row TPUs 302 and 304 receive X operand bits X(bit15)-X(bit8) and X(bit7)-X(bit0), respectively, during initial clock cycle CLK(0). Other TPUs in the same column are configured to receive the same X operand at other clock cycles, if pipelining of such operand is employed. For example, TPUs 312 and 314 receive X operand bits X(bit15)-X(bit8) and X(bit7)-X(bit0), respectively, at initial clock cycle CLK(0). Similarly, TPUs 322 and 324 receive X operand bits X(bit15)-X(bit8) and X(bit7)-X(bit0) from registers 320 of TPUs 312 and 314, respectively, at clock cycle CLK(1), and TPUs 332 and 334 receive X operand bits X(bit15)-X(bit8) and X(bit7)-X(bit0) from registers 320 of TPUs 322 and 324, respectively, at clock cycle CLK(2). Exemplary array 300 also is configured to receive a 16-bit Y operand; the top row TPUs 302 and 304 receive Y operand bits YIN(bit3)-YIN(bit0), the second row of TPUs 312 and 314 receive Y operand bits YIN(bit7)-YIN(bit4), the third row of TPUs 322 and 324 receive Y operand bits YIN(bit11)-YIN(bit8), and the fourth row of TPUs 332 and 334 receive Y operand bits YIN (bit15)-YIN(bit12).

In this example, the YIN bits are input into a register, such as Y(bit11)-Y(bit8) register 306. These Y bit registers 306, although optional in use, are configured to provide a portion of the Y operand to a TPUM in the corresponding TPU row at a given point in time. For example, YIN(bit7)-YIN(bit4) are applied to TPUM (2,1) and TPUM(2,2) as bits Y(bit7)-Y(bit4) at clock cycle one (i.e., CLK(1)), which is a clock cycle after bits Y(bit3)-Y(bit0) are applied to TPUM (1,1) and TPUM (1,2). Similarly, Y bit register 306 for bits Y(bit11)-Y(bit8) are clocked to provide these Y bits to TPUMs (3,1) and (3,2) at second clock cycle CLK(2), and Y bit register 306 for bits Y(bit15)-Y(bit12), are clocked to provide these Y bits to TPUMs (4,1) and (4,2) at third clock cycle CLK(3). In another embodiment, each Y bit register 306 is part of the associated TPUP block. As shown in FIG. 2, each TPUP circuit in a row of TPUs are clocked during the same ordinal clock cycle. For example, TPUPs (3,1) and (3,2) are in the same row and are clocked at the same time by CLK(3).

Further to the exemplary multiplier shown in FIG. 2, each TPUM of the TPUs in the top row, such as TPUMs (1,1) and (1,2), receive part of the X operand. However, each of the other TPUMs in lower rows of TPUs 312 and 314, and below, such as TPUMs (2,1), (2,2), etc., receive both a part of the upper bits of a partial product (e.g., either upper or lower PD bits) and a part of the X operand (e.g., either upper or lower X operand bits) from a TPU "upstream" in the flow of arithmetic operations (i.e., a TPU in an above row). The TPUMs perform a multiplication function using the select Y and X operand bits and communicates the upper bits of the partial product to a pipeline register via PTB lines. Each of the TPUMs in the left column are coupled to a corresponding TPUM in the right column via lines PR ("Product to the Right") and lines PL ("Product from the Left"). These lines provide the lower bits of a partial product to form a portion of the final result. The portion of the final result, which may be delayed, is output from lines DR(bit3)-DR(bit0). If the portion of the final result is delayed, which is programmable, the portion is temporally stored in pipeline register 308. Pipeline registers 308 can, in some embodiments, be part of a TPUP circuit.

In operation, bits X(bit15)-X(bit8) and X(bit7)-X(bit0) are multiplied by bits Y(bit3)-Y(bit0) in respective TPUMs (1,1) and (1,2) at an initial clock cycle CLK(0), with the portion of the final result stored until clock cycle 4 ("CLK (4)"), which is 3 clock delays (i.e., g=3, and hence "DLY (3)") after clock cycle one. The upper bits of both the partial results and the X operand are stored in TPUPs (1,1) and (1,2), respectively, until the next clock cycle, CLK(1). During clock cycle CLK(1), bits X(bit15)-X(bit8) and X(bit7)-X(bit0) are each multiplied by bits Y(bit7)-Y(bit4) in respective TPUMs (2,1) and (2,2), with the resulting partial product during that cycle added to bits PD(bit15)-PD(bit8) and PD(bit7)-PD(bit0), respectively. These upper bits (i.e., PD(bit15)-PD(bit8) and PD(bit7)-PD(bit0)) of the partial results are respectively determined in TPUMs (1,1) and (1,2) during the previous clock cycle CLK(0). Also, additional lower bits (i.e., bits PR(bit7) to PR(bit4)) of the final result, as determined during clock cycle CLK(1), are stored as bits DR(bit7)-DR(bit4) in register 308 of TPU 314 until clock cycle CLK(4).

During clock cycle CLK(2), bits X(bit15)-X(bit8) and X(bit7)-X(bit0) are each multiplied by bits Y(bit11)-Y(bit8) in respective TPUMs (3,1) and (3,2), with the resulting partial product during that cycle added to bits PD(bit15)-PD(bit8) and PD(bit7)-PD(bit0)) as determined in respective TPUMs (2,1) and (2,2)). The values of the partial products, as determined in TPUMs (2,1) and (2,2), are clocked out of TPUPs (2,1) and (2,2) to the TPU row below during clock cycle CLK(2). Further, additional lower bits (i.e., bits PR(bit11) to PR(bit8)) of the final result as bits DR(bit11)-DR(bit8) are stored in register 308 until clock cycle CLK(4), which is one delay (i.e., DLY(1)) after clock cycle CLK(3). The upper bits of the partial results are stored in TPUP (3,1) and TPUP(3,2) and the X operand bits are stored in registers 320 of TPUs 332 and 334 until the next clock cycle. This process continues in a similar fashion until clock cycle CLK(4) when the bits PD(bit15)-PD(bit0) form the upper bits of the final result (i.e., 32 bit product) and bits DR(bit15)-DR(bit0) form the lower bits thereof. That is, upper bits PD(bit15)-PD(bit8) are concatenated with upper bits PD(bit7)-PD(bit0), which in turn is concatenated with lower result bits DR(bit15)-DR(bit12), DR(bit11)-DR(bit8), DR(bit7)-DR(bit4), and DR(bit3)-DR(bit0).

In this exemplary 16-bit by 16-bit multiplier, four clock cycles are used to get the final result. But it should be noted that a final result using other operands can be computed for each clock cycle, which increases the processing speed of device using a TPU structure. Hence, each pipelined stage generates a partial product so that after four clock cycles, a final result is generated after each clock cycle. For example, after the partial results multiplying a first Y operand and a first X operand in TPUs 302 and 304 of FIG. 2 are determined, the results are clocked to the next row of TPUs for further processing. During clock cycle CLK(1), a second Y operand (i.e., Y(bit3) to Y(bit0)) can be multiplied by a second X operand (i.e., X(bit15) to X(bit0)) in TPUs 302 and 304. In other exemplary implementations, a pipeline register can be used only in the second and fourth rows so that the result is achieved in two clock cycles, with a period of a clock cycle that is greater than for the maximum pipeline case (e.g., four stages of pipelines).

A feature of an arrayed TPU pipeline structure is the interleaved queue allows the same registers (e.g., within a TPUP circuit) to be used for either a Y-input delay or for result value delay (e.g., DR lines). This works because the sum of the number of Y-operand delays and the number of required result value delays is the number of pipeline stages. For TPUs that are not used for multiplication (or shifting), this same register queue is usable as a variable length delay chain. Hence, the TPUP circuit can be used to execute different functions during different clock cycles.

Figure 3:
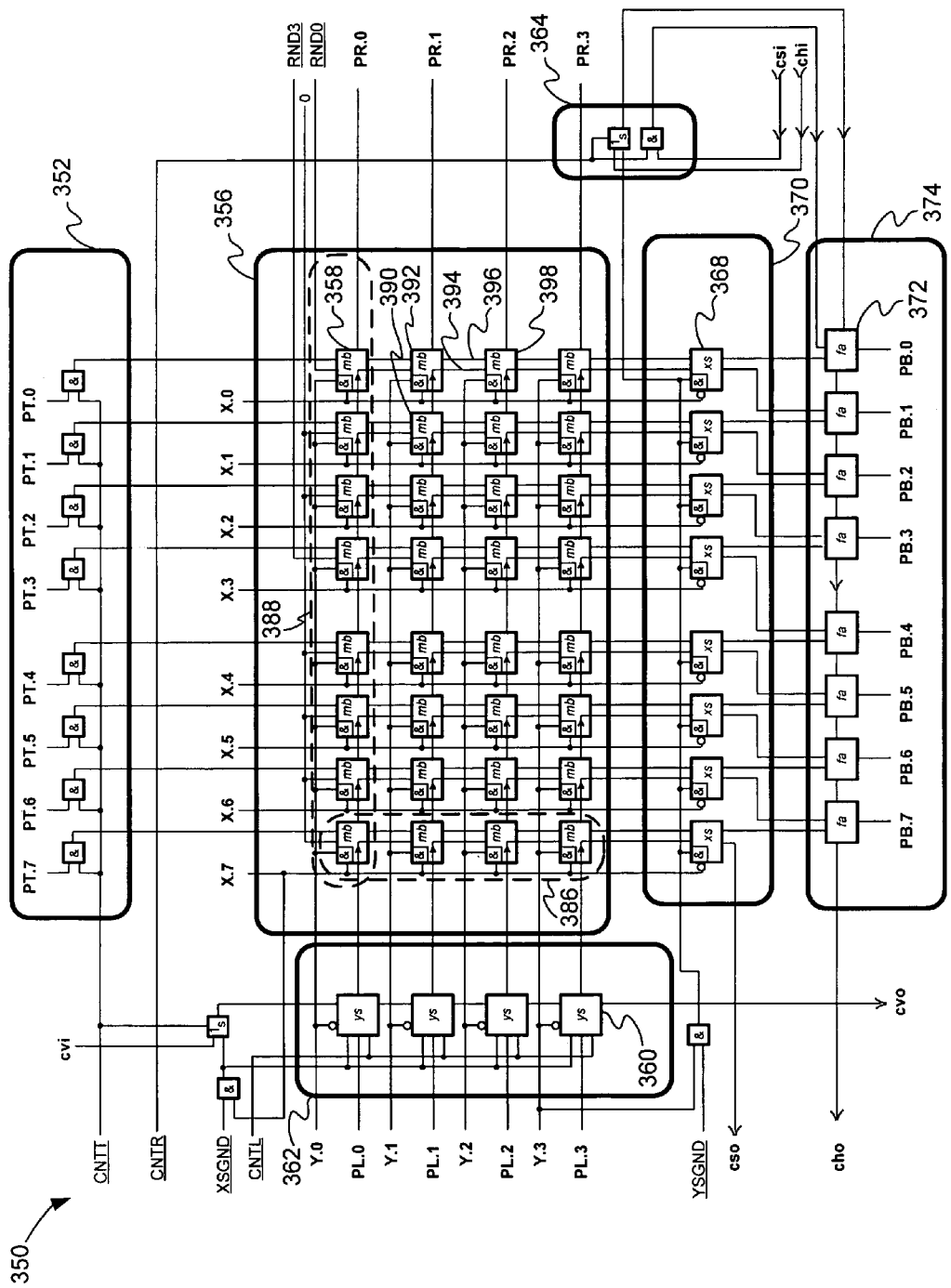
FIG. 3 is a schematic diagram of an exemplary TPU multiplier circuit in accordance with an embodiment of the present invention.

FIG. 3 illustrates an exemplary TPUM circuit of a TPU in accordance with a specific embodiment of the present embodiment. As shown, exemplary TPUM circuit 350 includes the circuits shown, which are interconnected and designed to receive control signals during a specific mode (a mode of functionality of a TPU of defined by one of a subset of control signals where the functionality occurs over one or more clock cycles), which are underlined in FIG. 3, and to communicate data upon which arithmetic operations are performed. Multiplier circuit 356 performs a multiplication function and is coupled to sign correction circuits 362 and 370, which are used when the operands are signed (i.e., either positive or negative). Multiplier circuit 356 is coupled to partial result circuit 352, which provides the partial result from another row of TPUs. Further, multiplier circuit 356 is coupled to full adder circuit 374 for forming an immediate partial result. In at least one embodiment, full adder circuit 374 can be configured to employ carry-look-ahead ("CLA")

techniques to restore the intermediate partial result(s) at one or more pipeline stages. Horizontal carry circuit 364 can be employed to provide carries necessary to perform CLA carries. In some embodiments, exemplary TPUM circuit 350 is referred to as a combinational multiplier circuit that is configurable to perform signed (or unsigned) multiplication either by itself, or alternatively, with other TPUM circuits 350 (to form a larger multiplier circuit). In another embodiment, TPUM circuit 350 is configured to perform other arithmetic functions (such as adding, subtracting, etc.), logical functions (such as OR, AND, etc.), and/or combinations thereof.

Partial result circuit 352 operates to provide upper bits of an immediate partial result via PT lines (i.e., PT7 to PT0) if a TPUM is upstream, or is above TPUM 350 (i.e., the TPU in which TPUM 350 resides is not in the top row of TPUs). Otherwise, if TPUM 350 resides in a TPU in the top row, then no previously determined partial result is considered. Rather, X operand bits X.7 to X.0 will be supplied to multiplier circuit 356. Partial result circuit 352 is enabled with control signal CNTT; when it is activated, partial results are passed through to multiplier circuit 356. But when not activated, zero values are supplied to multiplier circuit. In one embodiment, CNTT means "Continue Top," and when set indicates that a TPU exists above TPUM 350 in a common TPU array. An exemplary basic block of partial result circuit 352 is a logical AND operator circuit.

Other control signals that define the position of TPUM 350 in an array of TPUs are CNTR and CNTL. If CNTR ("Continue Right") is activated, or set, then a TPU is located to the right of TPUM 350 (e.g., in same array). If not activated (e.g., is a zero bit), TPUM 350 resides in a TPU that is in the far right-most column. When activated, however, carries (i.e., CSI and CHI) from a TPUM to the right of TPUM 350 are propagated into full adder circuit 374. But if not activated, then lines PR.3 to PR.0 will provide the lower bits of the final result.

If CNTL ("Continue Left") is activated, then a TPU is to the left of the TPU in the array in which TPUM 350 resides. When activated, the lower bits of the partial results from the TPU on the left is communicated via lines PL.3 to PL.0 into the array. Otherwise, when CNTL is not activated, then no TPU lies to the left of TPUM 350. Further, when left-most TPUM 350 is the left-most TPU in a TPU array, then the most significant bit of the X operand is to be connected to the left-most column. But if the number of bits in the X operand is not a multiple of, for example, eight bits, then X operand sign extension can be employed. In particular, if the X operand is unsigned then "zero"values are extended from the most significant bit of the operand to the most left-most column. If the X operand is a signed operand, then the most significant bit of that X operand is extended from its position to the left-most column.

These three control signals and other control signals described in connection with FIG. 3 are defined in FIG. 5. The table in FIG. 5 indicates what control signals are related to one or more bits in a control word. In some embodiments, the control bits associated with corresponding control signals are generated from a configuration memory, such as a Random Access Memory ("RAM") or other memories known in the art. In a specific embodiment, these control bits are used for Abstract Binary Code ("ABC") representation for use in programming tools, for example.

Multiplier circuit 356 is configured to multiply each of X operand bits X.7 to X.0 with each of Y operand bits Y.3 to Y.0. This bit-by-bit multiplication is performed in multiplier bit circuit 358, the functionality of which is described in FIG. 9. Further, multiplier bit circuit 358 adds to the product from each bit-by-bit multiplication at least one of the following: a partial product bit from one of the PT.7 to PT.0 lines if such multiplier bit circuits 358 are coupled to the Y.0 line in grouping 388, and if without grouping 388, a partial product bit generated by an above multiplier bit circuit and/or a partial product bit generated from a multiplier bit circuit located above and to the left of multiplier bit circuit 358. As shown, exemplary multiplier circuit 356 includes multiplier bit circuits 358 in grouping 388 that are configured to receive a "zero" value, an RND0 value and an RND 3 to provide a "rounding" function, if selected, to the multiplier circuit performing a multiplication process.

In a specific embodiment, exemplary multiplier bit circuit 358 operates, in part, as a "carry-save adder." The most significant bit resulting from a carry-save adding operation is the carry ("CARRY bit"), which is provided to the next multiplier bit located below multiplier bit circuit 358. The least significant bit resulting from a carry save adding operation is the sum ("SUM bit"), which is provided to another multiplier bit circuit that is one over to the right and one down from multiplier circuit 385. For example, multiplier bit circuit 398, which is functionally and structurally similar to multiplier bit circuit 358, is coupled via lines 394 and 396 to multiplier bit circuit 392. In this example, line 396 and line 394 convey the SUM bit and the CARRY bit, respectively, as generated by multiplier bit circuits 392 and 390. Further, multiplier bit circuit 398 generates a partial result bit on a PR line ("Product to the Right"), such as line PR.2, where the partial result bit is considered either a final result bit, if multiplier circuit 356 is in the right-most column, or a partial result bit conveyed to another multiplier circuit 356 that is to the right of multiplier bit circuit 398. In the latter case, the partial result bit generated by multiplier bit circuit 398 is provided to the multiplier bit circuit on the right along a PL line ("Product from the Left"), similar to those multiplier bit circuits in grouping 386 that receive a partial result bit from multiplier bit circuits to the left of multiplier circuit 356.

In accordance with one embodiment, one or more TPUMs 350 includes either a Y sign correction circuit 362 or X sign correction circuit 370, or both, when constituting an array of TPUMs as a multiplier. These correction circuits compensate for multiplication of one or more signed operands (i.e., either negative or positive) by subtracting the other operands from the final results. If the X operand is determined to represent a signed, negative number, then Y sign correction circuit 362 is used to adjust the final result (i.e., the most significant bits of the final result) by the magnitude of the number represented by the Y operand. Similarly, if the X operand is determined to represent a signed, negative number, then X sign correction circuit 370 is used to adjust the final result (i.e., the most significant bits of the final result) by the magnitude of the number represented by the X operand. Further, a final product resulting one or more signed operands can be represented by the exemplary relationship expressed in Equation 2.

$$P = (X \cdot Y) = [(X \cdot Y) \text{unsigned}] - [2^n \cdot Y(\text{msbit}) \text{ to } Y(\text{bit0})] \cdot X(\text{msbit})] - [2^m \cdot [X(\text{msbit}) \text{ to } X(\text{bit0})] \cdot Y(\text{msbit})] \quad \text{Eqn. 2}$$

where "n" is the number of bits in the X operand, "m" is the number of bits in the Y operand, X(msbit) is X.7 and Y(msbit) is Y.3, where X.7 and Y.3 exemplify the most significant bits of TPUM 350 in FIG. 3.

In an array of TPUMs 350 (i.e., an array of TPUs including TPUMs), Y sign correction circuit 362 is activated in those TPUMs 350 residing in left-most TPUs and X sign correction circuit 370 is activated in those TPUMs 350 located in the bottom-most row of TPUs. Returning to the exemplary 16-bit by 16-bit multiplier depicted in FIG. 2, TPUMs (1,1), (2,1), (3,1) and (4,1) can be configured such that each respective Y sign correction circuits 362 of these TPUMs (not shown in FIG. 2) can be activated to provide for correction of the result due to a negatively signed X operand. Also, TPUMs (4,1) and (4,2) can be configured such that each respective X sign correction circuits 370 of these TPUMs (not shown in FIG. 2) can be activated to provide for correction of the result due to a negatively signed Y operand.

Further to this example, and in view of Eqn. 2, consider that the X operand represents a negative number. In this instance, the Y operand (i.e., Y(msbit) to Y(bit0)) is subtracted from the upper bits of the final result to obtain a sign corrected product. Specifically, Y(msbit) is subtracted from the most significant bit of the final result (i.e., "PD(msbit)"), Y(msbit−1) is subtracted from PD(msbit−1), etc., until the least significant Y operand bit, Y(bit0), is subtracted from the final result bit PD(msbit−m), where m is the number Y operand bits. Thus, for a 16-bit by 16-bit multiplier, Y(bit 16) is subtracted from PD(bit32), Y(bit15) is subtracted from PD(bit31), etc., and Y(bit0) is subtracted from PD(bit16). The lower bits of the final result (i.e., PD(bit15) to PD(bit0)) do not require a subtraction operation to sign correct those bits. Similarly, if the Y operand represents a negative number, then the X operand bits (i.e., X(msbit) to X(bit0)) are subtracted from the upper bits of the final result bits PD(msbit) to PD(msbit−n), where n is the number of X operand bits. Artisans of ordinary skill will appreciate that the nature of binary numbers in regards to ring modulo multiplication facilitates signed binary multiplication as described herein. Thus, signed multiplication can be accomplished without further processing of the lower bits of the partial or final products.

Exemplary TPUM 350 of FIG. 3 performs, as described in Eqn. 2, a multiplication of the X and Y operands as if they both are unsigned. But if either one or both of the operands are signed and negative (i.e., X(msbit)=1, and/or Y(msbit)=1) then the other operand's bits (i.e., such as bits Y(bit3) to Y(bit0) or bits X(bit7) to X(bit0) for the TPUM shown in FIG. 3) are subtracted from the final result. To accomplish the multiplication of signed operands, TPUM 350 uses two control signals for enabling operation of sign correction circuits 362 and 370: XSGND and YSGND.

The XSGND ("X operand is signed") and YSGND ("Y operand is signed") controls signals indicate whether the X operand and Y operand, respectively, are a signed value. These controls signals are used to enable subtraction of (or addition of a negative) correction values from the final result so that the output can be interpreted as a signed (i.e., two's complement) or unsigned number. For example, if the X-operand is to be interpreted as a signed value, the XSGND control is activated, or set to one, for TPUMs in the left-most column in an array of TPUs. When activated, the most significant bit of the X-operand is interpreted as the sign bit. If the Y-operand is to be interpreted as a signed value, the YSGND control is set to one, for example, in TPUMs in the bottom row of an array of TPUs. Here, the most significant bit of the Y-operand is the sign bit. Although in a specific embodiment of the present, "two's complement" is the exemplary sign convention, other sign convention such as "one's complement," etc., are within the spirit and scope of the present invention.

Figure 9:
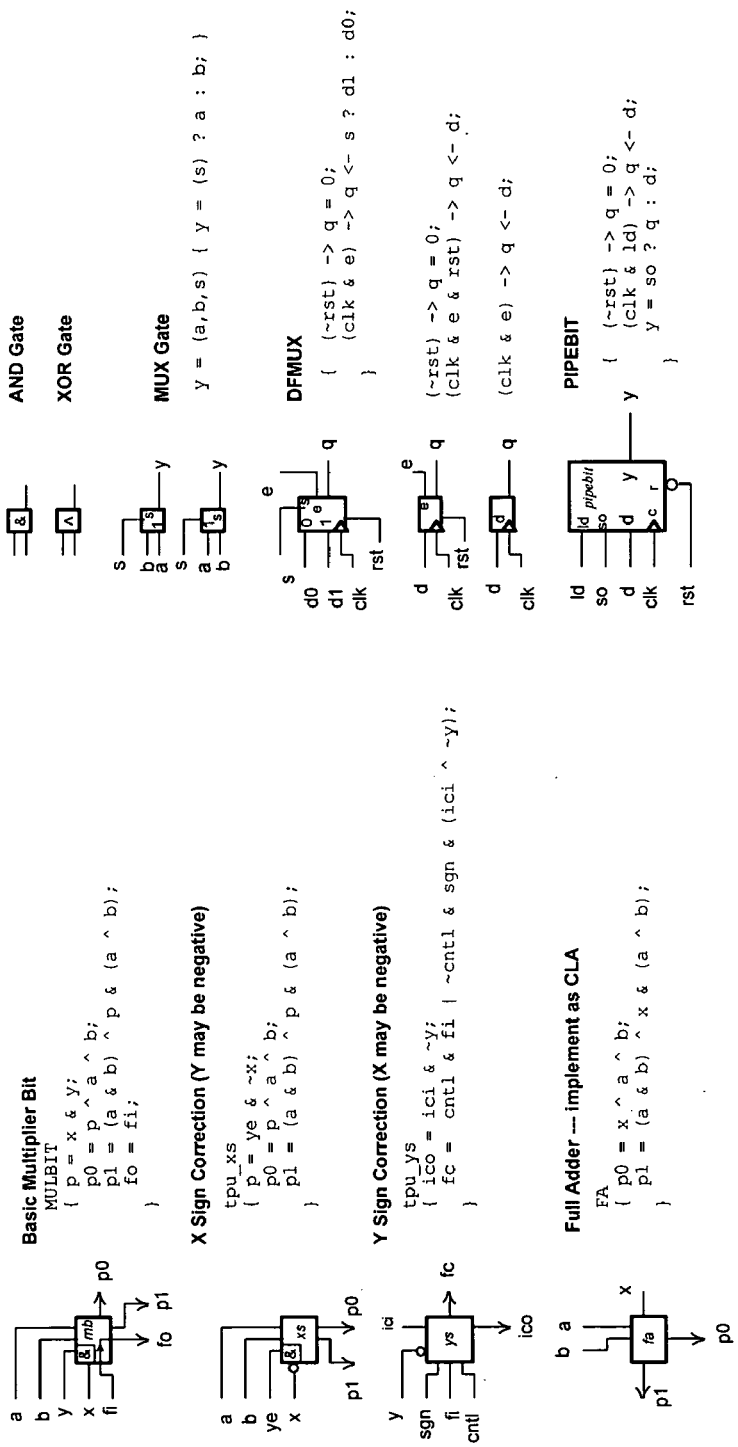
FIG. 9 depicts schematic diagrams of additional exemplary circuits employed in some embodiments of the present invention.

In one embodiment, exemplary component circuits ysign ("ys") circuit 360 and xsign ("xs") circuit 368 respectively constitute Y sign correction circuit 362 and X sign correction circuit 370. FIG. 9 describes examples of ysign circuit 360 and xsign circuit 368 that are suitable to practice an embodiment of the present invention.

TPUM 350 of FIG. 3 also includes full adder circuit 374, which is configured to generate the upper bits of either the intermediate partial products or the final product. Full adder circuit 374 is designed to receive CLA carries, such as CSI and CHI, and can provide another carry CHO for a TPUM to the left of TPUM 350, if necessary. Further, full adder circuit 374 restores the various carries, especially from carry-save adder functions of multiplier bit circus 358. Full adder circuit 374 is composed of bitwise full adder circuits 372, which in some embodiments operate as ripple adders. Exemplary bitwise full adder circuits 372 suitable to practice an embodiment of the present invention are described in FIG. 9.

Figure 4:
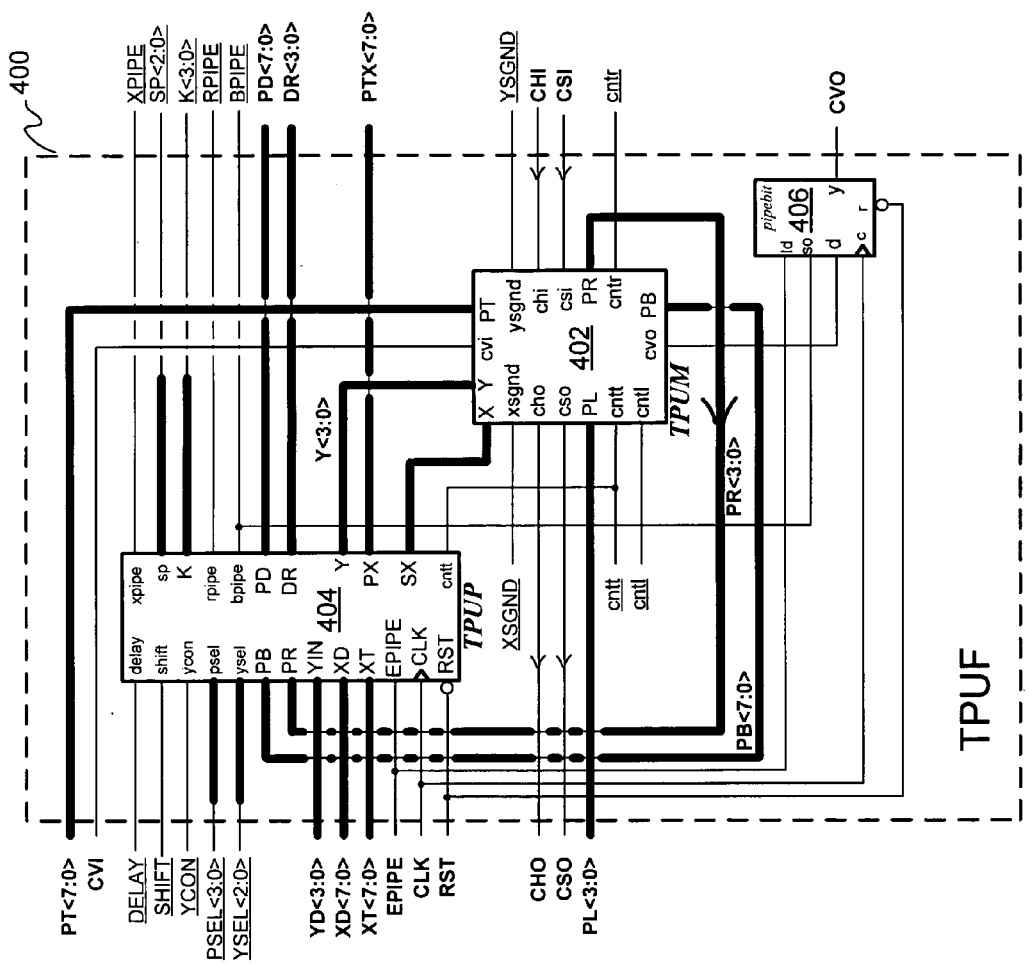
FIG. 4 is a block diagram illustrating interconnections between a TPU pipeline circuit and a TPU multiplier circuit of an exemplary TPU.

FIG. 4 illustrates an exemplary functional circuit as TPUF 400 according to one embodiment of the present invention. TPUF 400 can be represented by two primitives representing circuits; one primitive representing the functionality of TPUM 402 as a multiplier circuit, and one primitive representing the functionality of TPUP 404 as a pipeline circuit. Also shown, is the interconnections among TPUM 402, TPUP 404, and the global connections for communicating control signals, data, etc. An exemplary TPUM 402 is TPUM 350 of FIG. 3 and an exemplary TPUP 404 is TPUP 700 of FIG. 7. It should be noted that to efficiently generate partial products, the interconnects between TPUM 402 and TPUP 404 are dedicated in some embodiments and do not need programming for effectuating the functionality of TPUF 400. In other words, the TPU interconnects do not require expensive programmable routing resources internally, but can select to use programmable routing resources for providing the X, Y and P values to rest of a programmable logic fabric. Also shown in FIG. 4 is pipebit 406, which is a pipeline register for storing and propagating the vertical carry bit CVO.

FIG. 5 shows a table of control signals for configuring TPUF 400 of FIG. 4, in accordance with an embodiment of the present invention. For example, TPUF 400 can be configured to operate as a partial multiplier of a larger multiplier if control bits 0 and 1 are both reset to zero. But if bit 0 is set to one with bit 1 reset to zero, then TPUF 400 can operate as a delay chain, as will be discussed in connection with FIG. 7. Further, setting bit 1 to one with bit 0 reset to zero configures TPUF 400 to enable shifting operations.

Bit 2 is set to one if YIN bits are to be a constant where control bits 16 to 19 constitute the "K" field. The K field is a number (e.g., 0000 to 1111) used as a constant number if bit 2 is set so that YIN bits are to be a constant.

Bits 30 and 31 are employed if the TPUF 400 of FIG. 4 is to round its final result of a multiplication function. That is, rounding control signals allow the addition of a rounding bit to most of the positions in the least significant bits. In some embodiments, such control bits (or signals) can be applied to TPUM 350 of FIG. 3. Bit 30 ("RND0 configuration bit") allows the addition of the value $2^{}(4n)$ to the final result, where "n" is the TPU row number starting with n=0 in the top row. This signal can be set to embed a "rounding operation" into the multiplier operation. Similarly, bit 31 ("RND3 configuration bit") adds the value $2^{}(4n+3)$ to the final result. In typical operation, either bit 30 or bit 31 bit need only be set to one in just one of the TPUs in the right column of a TPU array. Other control bits and signals are discussed below in connection with FIG. 7.

Figure 6:
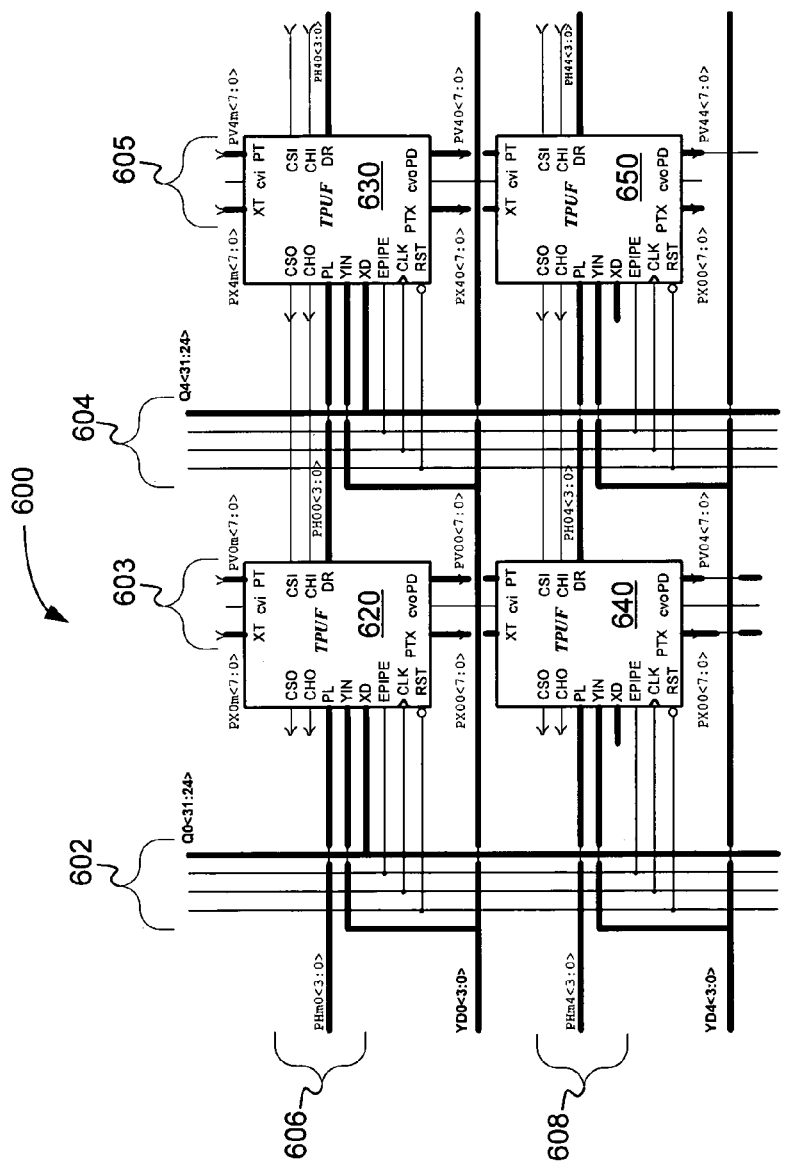
FIG. 6 is a schematic showing an array of four TPUs and their exemplary interconnections in accordance with an embodiment of the present invention.

FIG. 6 depicts array 600 of TPUFs 400 of FIG. 4 configured as a portion of a larger multiplier, according to a specific embodiment of the present invention. As shown, FIG. 6 illustrates the data flow among TPUFs 620, 630, 640, and 650 for a two-block by two-block array for a 16-bit by 8-bit multiplier, or alternatively, a subset of an array for a large multiplier (or shift array, if so configured). The X operand values enter the array in the top row of TPUs 620 and 630 using the XD input ports. In this instance, the X operand is communicated to the XD ports via global interconnection buses Q<31:0> 602 and 604, which are part of a programmable logic fabric. In this example, the upper 8 bits of the X operand are communicated via Q0<31:24> bus lines whereas the lower 8 bits are communicated via Q4<31:24> bus lines. Further to this example, the top row of TPUs 620 and 630 propagate the pipelined value of the X operand to a next TPU row of TPUFs 640 and 650 below by using PX lines. The PX lines connect the PTX output ports of one TPU to the XT input ports of the TPU below. The PTX output value can be programmed to be the same as the XT (or alternatively, XD) input or a registered value of the XT or XD input.

Any TPU row may be programmed to implement a single pipeline stage, where a highest clock frequency of operation is realized when the X input is registered in the top row and the PTX output is pipelined registered for each row in a manner similarly depicted in FIG. 2. In alternative embodiments, the PTX output may be non-registered so that the latency (number of clock cycles) needed to achieve the result is reduced. In other embodiments, one or more TPUs can be configured to register the PTX output in every other row of TPUs in an array of TPUs. For example, the TPUPs of TPUFs 640 and 650 can be configured to provide the first pipelined values of the X operand rather than the TPUPs of TPUFs 620 and 630.

Again, intermediate results in columns to the left of the result column (i.e., right-most column) are output on the DR lines, which are connected to the PL ports of the next TPU in the same row, but to the right. These intermediate results can be communicated via one of the global interconnect lines PH00<3:0> and PH40<3:0> of bus 606 and global interconnect lines PH04<3:0> and PH44<3:0> of bus 608. For example, the intermediate results of TPUF 620 are communicated from the DR lines via PH00<3:0> lines on PH bus 606 to the PL ports (or lines) of TPUF 630. In this case, PH buses 606 and 608 are used only for TPU to TPU horizontal connection. It should be noted that in this example the PL input ports are not used for the TPU blocks in the left-most column.

The intermediate product results in the vertical direction are transferred from the PD output ports from each TPU to the PT ports of the TPU below using the PV lines (i.e., PV buses PV00<7:0> and/or PV40<7:0>) as shown in FIG. 6 for columns 603 and 605. The PD output value onto PV buses can be registered if the TPU is the bottom row of a pipeline stage and otherwise is the direct combinational intermediate product result.

Left column 603 of array portion 600 can include a vertical carry signal CVO (see FIG. 4 for pipebit 406 primitive) that is used for sign correction, for example, in a TPUM 350 of FIG. 3 of a TPUF in FIG. 5. A characteristic of an exemplary TPU architecture is the use of a full carry-look-ahead (CLA) capability. This allows the intermediate product to be fully restored at each pipeline stage.

To complete the arithmetic requirements of the partitioning of a large multiplier into an array of TPUs, one vertical carry signal (i.e., CVI) and two horizontal carry signals (i.e., CSI and CHI) are generated. These are show in FIG. 6 as to correspond with CVI, CHI and CSI inputs of the neighboring TPU blocks. Again, in some embodiments, the horizontal CHO/CHI and CSO/CSI carries are part of the carry-look-ahead process and need not be registered. But the vertical CVI carry can be used for sign correction and is registered for each pipeline stage. In some embodiments, the CVI may be used as an extension of the partial product output PD. That is, the CVI can be thought of as a sign and/or an additional bit as a result of the multiplication process (i.e., a ninth bit).

Figure 7:
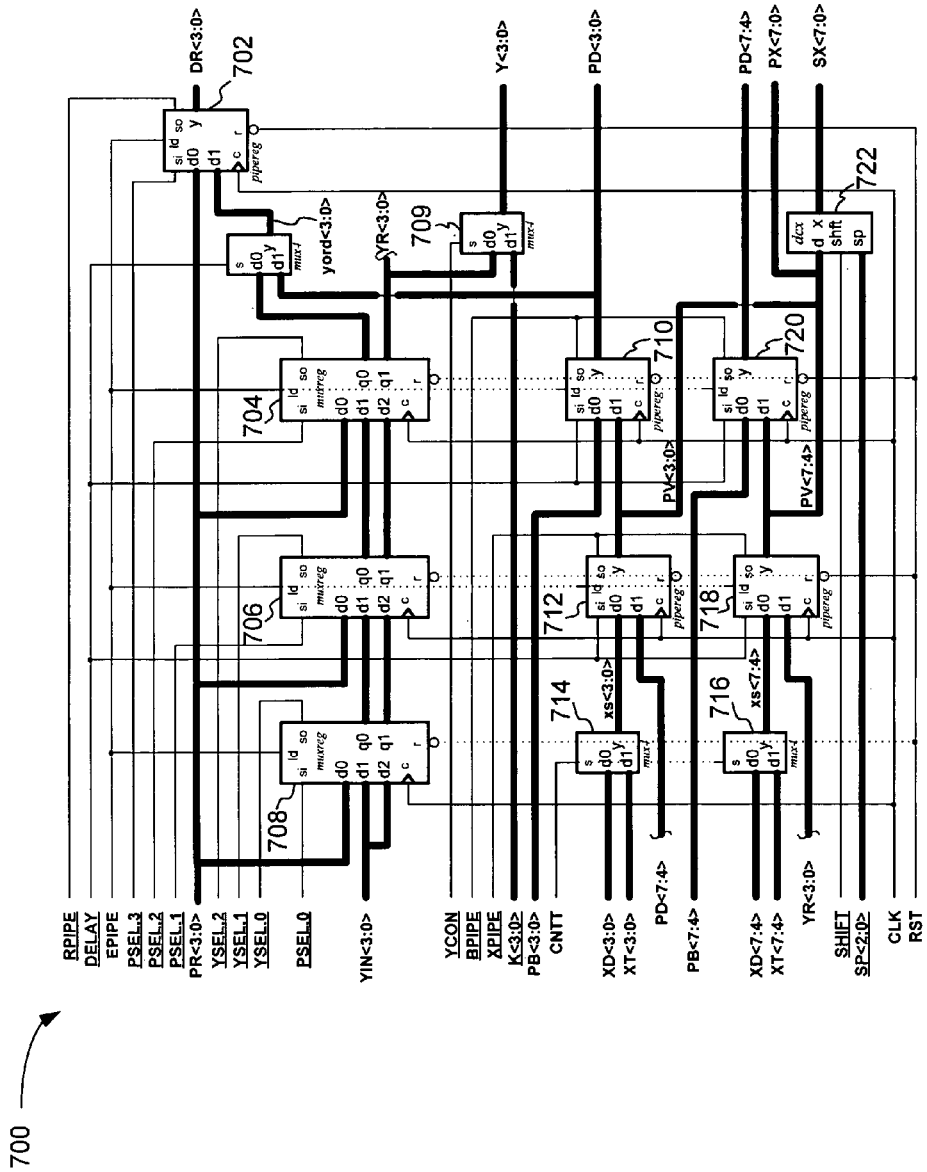
FIG. 7 is a schematic of an exemplary TPU pipeline circuit in accordance with an embodiment of the present invention.
Figure 8:
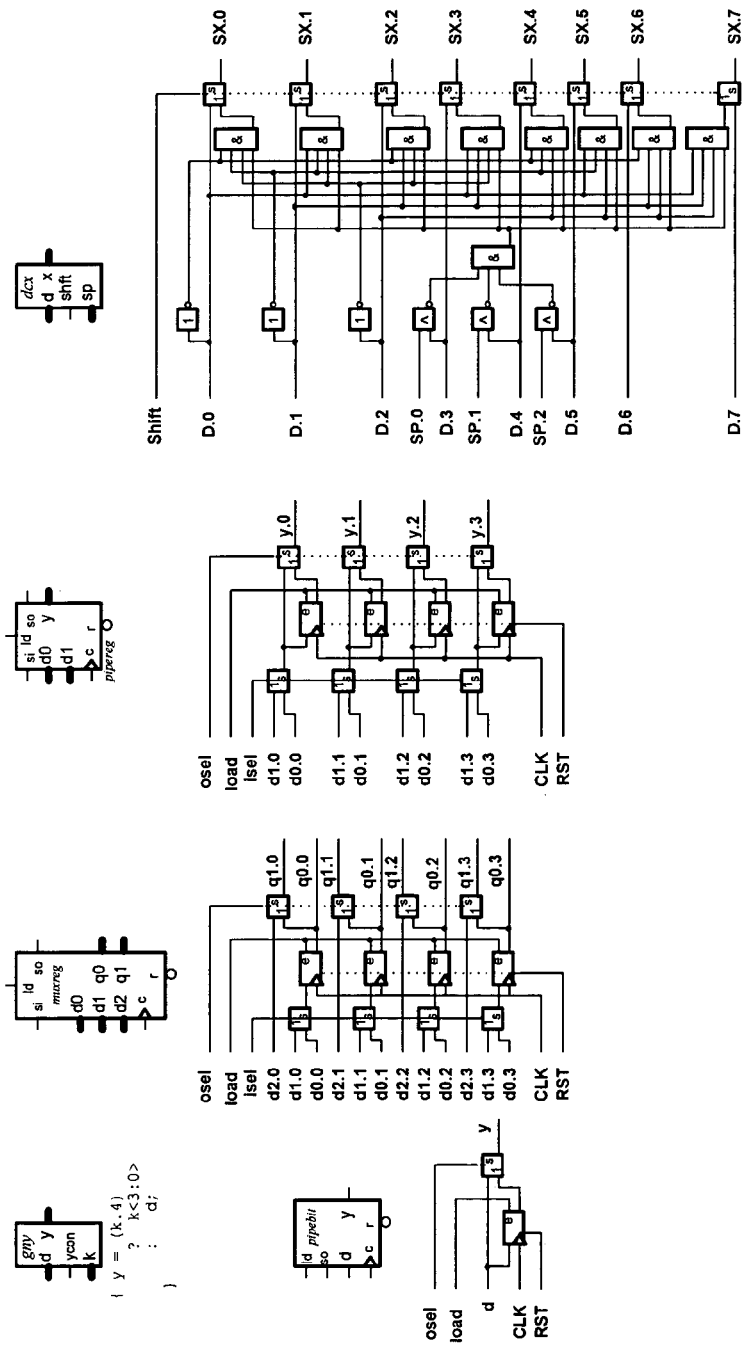
FIG. 8 depicts schematic diagrams of exemplary circuits employed in some embodiments of the present invention.

FIG. 7 illustrates an exemplary TPUP 700 in accordance with a specific embodiment of the present invention. In some embodiments, TPUP 700 is similar in function and structure as TPUP 404 of FIG. 4. Exemplary TPUP 700 is composed of one or more types of registers, such as those depicted in FIG. 7, for providing pipeline delay(s), a delay chain, and/or a shift operation. Muxregs 708, 706, and 704 and pipereg 702 of FIG. 7 can be configured to, for example, provide a delay in providing a partial product output at DR(bit3) to DR(bit0) (i.e., DR<3:0>). Alternatively, these register can be configured to generate a delay in providing YIN bits Y(bit3) to Y(bit0) to a TPUM as Y<3:0>. For example, TPUP(1,2) of TPU 304 of FIG. 2 might include pipereg 702 and muxregs 708, 706, and 704 of FIG. 7 as register 308 for providing four clock delays before outputting the partial product of DR(bit3) to DR(bit0). In particular, during clock cycle CLK(0), the partial product bits generated by TPUM (1,2) is input into muxreg 708 at its register input D0 via lines PR<3:0>. At clock cycle CLK(1), bits DR(bit3) to DR(bit0) are shifted out of muxreg 708 to muxreg 706. At clock cycle CLK(2), bits DR(bit3) to DR(bit0) are shifted out of muxreg 706 to muxreg 704. At clock cycle CLK(3), bits DR(bit3) to DR(bit0) are shifted out of muxreg 706 to pipereg 702. At clock cycle CLK(4), DR(bit3) to DR(bit0) are shifted out as a portion of the final result. Suitable piperegs, muxregs, and dcx elements to practice the present invention, as shown in FIG. 7, are described in FIG. 8.

In contrast, Y bit register 306 of TPU 332 of FIG. 2 can be realized by using TPUP 700 of FIG. 7. In some embodiments, Y bit register 306 is integrated into a specific TPUP, such as TPUP (4,1). In exemplary operation, bits YIN(bit15) to YIN(bit12) are applied to Y bit register 306 as YIN<3:0> of FIG. 7 during an initial clock cycle CLK(0). Hence, YIN<3:0> bits can be applied to register input "D1" of muxreg 708 during CLK(0). At the first clock cycle CLK(1), bits YIN(bit15) to YIN(bit12) are shifted from muxreg 708 to muxreg 706. At the second clock cycle CLK(2), bits YIN(bit15) to YIN(bit12) are shifted from muxreg 706 to muxreg 704. At the third clock cycle CLK(3), bits YIN (bit15) to YIN(bit12) are shifted out multiplexer 709 as bits Y<3:0> to TPUM (4,1) of FIG. 2. Similar processes occur with the other Y bit registers 306 of FIG. 2, which can be realized also by TPUP 700 of FIG. 7. In some embodiments, the Y<3:0> bits that are provided to a TPUM are constant numbers as determined by K<3:0>, which is multiplexed through a mux4 multiplexer, such as mux 709. One skilled in the art should appreciate the same pipeline registers of a TPU thus can be used to delay inputs into a TPUM or to an external circuit element via global interconnect lines (not shown), for example, as well as delaying outputs from TPUMS or other circuit elements.

Control bits 23:20 and 26:24, as shown in FIG. 5, respectively are used to provide for control signal PSEL and YSEL of FIG. 7. Control signal PSEL is a pipeline output select signal that determines the number of delay steps before providing the DR<3:0> output. Control signal YSELY determines the number of vertical pipeline stages so that the YIN bits are multiplied at the appropriate time. Moreover, EPIPE control signal (control bit not shown) is used to enable pipeline register loading on a given clock cycle. This signal is also distributed to TPUs in the same column for enabling "pipeline stall" action without having to discontinue the clock. But for the lower bits of a TPU in the right-most column to be output as DR<3:0>, the registered output (i.e., final pipeline stage in the row) is shifted out when the RPIPE configuration bit (i.e., bit 15) is set to one in the TPU blocks of the right column.

Returning back to FIG. 2, the TPUPs, such as TPUP (1,1), TPUP (1,2), etc. are realized by using piperegs 710 and 720. In particular, the upper bits of the partial product generate by a TPUM is provided to lines PB<7:4> and PB<3:0> for temporal storage in piperegs 710 and 720. When enabled by control signal BPIPE, which is associated with control bit 14 of FIG. 5, piperegs 710 and 720 provide the partial results to the next TPUM in a row below via lines PD<7:4> and PD<3:0> of FIG. 7.

Control bit 11 and corresponding control signal XPIPE is used to enable a pipeline register for providing an output via a PTX line to a TPU below. To register the input operand values, such as the X operand, the control signal XPIPE is set to one for the TPUs in the top row while YSEL[0] control in TPU blocks are set to one. Setting YSEL bits, however, is not necessary if the Y operand is constant.

In another specific embodiment, TPUP 700 in FIG. 7 is configured as a delay chain, which delays a value input into YIN<3:0> from one to eight clock cycles. For example, the value (i.e., bits YIN(bit3) to YIN(bit0)) to be delayed is first input into register input "D2" of muxreg 708 for a delay of one to three clock cycles depending on whether one or more of registers muxreg 708, 706, and/or 704 are to be used. If the value is to be delayed by one clock cycle, then that value is input as YIN<3:0> into muxreg 704 as the only register in the delay chain. The delayed value is outputted onto YR<3:0> lines. The value can be delayed by an additional 2 clock cycles, when that value is outputted from the YR<3:0> lines on the right, as shown, of TPUP 700 of FIG. 7 into register input "D1" of pipereg 718. Pipereg 720 is coupled to pipereg 718 to provide the second additional clock cycle. After the second clock cycle of the additional delay of two cycles, the value is clocked out of register output "y" of pipereg 720 onto lines PD<7:4>. To add an additional delay of 3 clock cycles, the value on the PD<7:4> lines is fed into register input "D1" of pipereg 712. Then the value is clocked out of register output "y" of pipereg 712 into register input "D1" of pipereg 710 as another clock cycle delay. Lastly, the third additional clock delay is obtained by gating the value out of register output "y" of pipereg 710 into register input "D1" of pipereg 702. Thus, after the value has traversed each of these registers, a delay chain of 8 clock cycles has been realized. One skilled in the art should realize that any delay from 1 to 8 clock cycles can be generated using TPUP of FIG. 7. In other embodiments, additional clock cycles can be added to the delay chain by employing one or more additional TPUPs in series.

In yet another specific embodiment, TPUP 700 in FIG. 7 is configured as a shifting circuit that shifts a value of a Y operand input into YIN<3:0> by a number of bits defined by the X operand. In one embodiment of the present invention, a first subset and a second subset of X operand bits define the shift operation process. The first subset of bits indicates the row number in which a TPU will be used to perform a shift operation, and the second subset of bits indicates the number of bits that the Y operand is to be shifted. As shown in FIG. 7, the X operand bits are applied to lines XD<3:0> and XD<7:4> for communication to register input "d" of dcx 722 via piperegs 712 and 718. In this example, control bits SP<2:0> select a specific TPU row (e.g., row 0 to row 7) wherein a TPU in that specific TPU row is configured to perform the shift operation.

For example, suppose that the value 00011010 is applied as the X operand in a shift operation, with a Y operand of 0101. Here, X operand bits X(bit5), X(bit4), and X(bit3) form the first subset of bits. That is, bits X(bit5), X(bit4), and X(bit3) are "011," and these bits enable a TPU in TPU row 3 to perform the shift operation if bits SP<2:0> are also "011." X operand bits X(bit2), X(bit1), and X(bit0) form the second subset of bits, which is used to generate a multiplicative operand (i.e., SX(bit7) to SX(bit0)) that can be applied to the TPUM of the selected TPU for effectuating the shift function. Further to this example, X operand bits X(bit2), X(bit1), and X(bit0) are "010." Thus, bit SX(bit2) is 1 and all other SX bits are 0 such that bits SX(bit7) to SX(bit0) are 0000 0100. With 0000 0100 applied to bits X.7 to X.0 of the TPUM, and with 0101 applied to bits Y.3 to Y.0, the concatenated partial product and final result is 0000 0001 0100, which is "0101" shifted by two bits. Therefore, the Y operand is shifted in accordance with the bits of the X operand. One having ordinary skill in the art will appreciate that the Y operand can be shifted to the left and/or to the right by any number of bits in accordance with the present invention.

Figure 10:
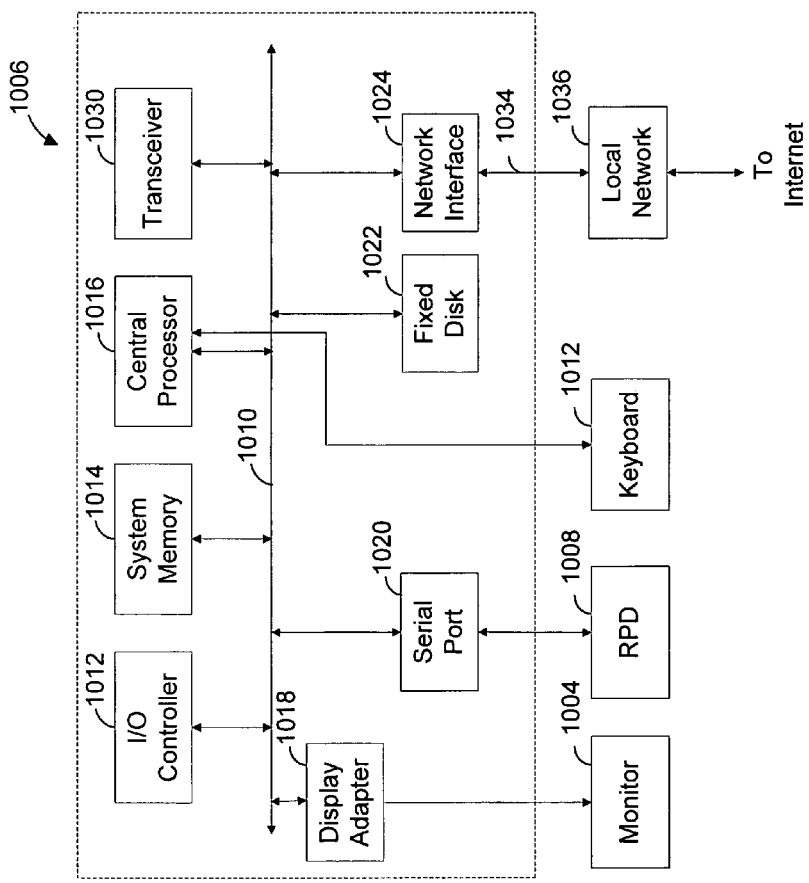
FIG. 10 illustrates subsystems of an exemplary computer system for use with the present system.

FIG. 10 illustrates subsystems found in one exemplary computer system, such as computer system 1006, that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 1006 are directly interfaced to an internal bus 1010. The subsystems include an input/output (I/O) controller 1012, a system random access memory (RAM) 1014, a central processing unit (CPU) 1016, a display adapter 1018, a serial port 1020, a fixed disk 1022 and a network interface adapter 1024. The use of bus 1010 allows each of the subsystems to transfer data among the subsystems and, most importantly, with CPU 1016. External devices can communicate with CPU 1016 or other subsystems via bus 1010 by interfacing with a subsystem on bus 1010. In one embodiment, CPU 1016 is a configurable processor according to the present invention. In another embodiment, a configurable processor (not shown) is adapted to operate in communication with the CPU 1016.

FIG. 10 is merely illustrative of one suitable configuration for providing a system in accordance with the present invention. Subsystems, components or devices other than those shown in FIG. 10 can be added without deviating from the scope of the invention. A suitable computer system can also be achieved without using all of the subsystems shown in FIG. 10. Other subsystems such as a CD-ROM drive, graphics accelerator, etc., can be included in the configuration without affecting the performance of computer system 1006.

One embodiment according to the present invention is related to the use of an apparatus, such as computer system 1006, for implementing a system according to embodiments of the present invention. CPU 1016 can execute one or more sequences of one or more instructions contained in system RAM 1014. Such instructions may be read into system RAM 1014 from a computer-readable medium, such as fixed disk 1022. Execution of the sequences of instructions contained in system RAM 1014 causes the CPU 1016 to perform process steps, such as the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to CPU 1016 for execution. Such media can take many forms, including, but not limited to, non-volatile media, volatile media and transmission media. Non-volatile media include, for example, optical or magnetic disks, such as fixed disk 1022. Volatile media include dynamic memory, such as system RAM 1014. Transmission media include coaxial cables, copper wire and fiber optics, among others, including the wires that comprise one embodiment of bus 1010. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to CPU 1016 for execution. Bus 1010 carries the data to system RAM 1014, from which CPU 1016 retrieves and executes the instructions. The instructions received by system RAM 1014 can optionally be stored on fixed disk 1022 either before or after execution by CPU 1016.

The above description is illustrative and not restrictive. Many variations of the invention will become apparent to those of skill in the art upon review of this disclosure. For example, a TPUM in accordance with a specific embodiment can be structured to include any number of X operand bits and/or Y operand bits. As another example, more than one clock signals can be used to optimize timing of pipelining functionalities (e.g., implementing pipeline stalls, etc.). The scope of the invention should, therefore, be determined not with reference to the above description, but instead should be determined with reference to the appended claims along with their full scope of equivalents.

What is claimed:

1. A transitive processing unit ("TPU") circuit configurable to function as a part of an array of TPU circuits, the TPU circuit comprising:
   a multiplier circuit comprising
      a first operand input for receiving a portion of a first operand and a second operand input for receiving a portion of a second operand, the multiplier circuit further configured to receive
      a portion of a left-immediate result generated by a left-TPU circuit to the left of the TPU circuit if present in the array, and
      a portion of an above-partial product from an above-TPU circuit above the TPU circuit if present in the array, where the multiplier circuit generates a portion of an immediate result and a portion of a partial product; and
   a pipeline circuit configured to temporally store the first operand input and the second operand input to generate the portion of the immediate result and the portion of a partial product at a specific point in time.

2. The TPU circuit of claim 1, wherein the portion of the first operand is communicated to another pipeline circuit in a below-TPU circuit located below the TPU circuit, if present in the array.

3. The TPU circuit of claim 1, wherein the portion of the second operand input is communicated to another multiplier circuit in a right-TPU circuit located to the right of the TPU circuit, if present in the array.

4. The TPU circuit of claim 1, wherein the portions of the first operand and the second operand are provided to the multiplier circuit at a first point in time.

5. The TPU circuit of claim 1, wherein the multiplier circuit is further configured to communicate the portion of the immediate result to a right-TPU circuit, if present in the array.

6. The TPU circuit of claim 1, wherein the pipeline circuit is further configured to temporally store the portion of the immediate result if the TPU circuit is a right-most TPU circuit.

7. The TPU circuit of claim 6, wherein the pipeline circuit stores the portion of the immediate result until a final result is generated.

8. The TPU circuit of claim 1, wherein the pipeline circuit is further configured to temporally store the portion of the partial product result.

9. The TPU circuit of claim 8, wherein the pipeline circuit provides the portion of the partial product to a below-TPU circuit, if present in the array.

10. The TPU circuit of claim 9, wherein the portion of the partial product is provided to the below-TPU circuit at a second point in time.

11. The TPU circuit of claim 1, wherein the multiplier circuit is further comprises a horizontal carry circuit to receive at least one horizontal carry for performing carry-look-ahead, if a right-TPU circuit to the right of the TPU circuit is present in the array.

12. The TPU circuit of claim 1, wherein the pipeline circuit further comprises a vertical carry register for storing a vertical carry, as generated by the multiplier circuit if the above-TPU circuit is present in the array.

13. The TPU circuit of claim 1, wherein the multiplier circuit further comprises at least one sign correction circuit configured to adjust the magnitude of the final result if at least one of the first operand and the second operand represents a signed, negative value.

14. The TPU circuit of claim 13, wherein the at least one sign correction circuit includes a sign detection circuit for determining if the most significant bit of one of the first operand and the second operand is a value indicating a negative number.

15. The TPU circuit of claim 13, wherein the at least one sign correction circuit is an x-signed correction circuit configured to subtract the portion of the first operand from the portion of the partial product if the second operand represents a signed, negative value.

16. The TPU circuit of claim 13, wherein the at least one sign correction circuit is a y-signed correction circuit configured to subtract the portion of the second operand if the first operand represents a signed, negative value.

17. The TPU circuit of claim 13, wherein the multiplier circuit is further configured to receive a vertical carry for sign correction of a negative, signed operand.

18. The TPU circuit of claim 1, wherein the TPU circuit is further configured to receive a set of functional control signals for configuring the functionality of the TPU circuit.

19. The TPU circuit of claim 18, wherein the set of functional control signals includes a first subset of functional control signals for configuring the TPU circuit as a part of multiplier.

20. The TPU circuit of claim 18, wherein the set of functional control signals includes a second subset of functional control signals for configuring the TPU circuit as a delay chain circuit.

21. The TPU circuit of claim 20, wherein the pipeline circuit is configured to receive the portion of the second operand, which provides a value to be delayed by the delay chain circuit.

22. The TPU circuit of claim 20, wherein the pipeline circuit comprises a number of registers where each register provides at least one delay.

23. The TPU circuit of claim 18, wherein the set of functional control signals includes a third subset of functional control signals for configuring the TPU circuit as a shifting circuit.

24. The TPU circuit of claim 23, wherein the pipeline circuit is configured to receive the portion of the second operand, where the second operand is to be shifted.

25. The TPU circuit of claim 24, wherein the pipeline circuit is configured to receive the portion of the first operand, where a subset of bits of the portion of the first operand defines the number of bit positions to shift the second operand.

26. The TPU circuit of claim 25, wherein the multiplier circuit generates the portion of the partial product concatenated with the portion of the immediate results as the second operand shifted.

27. A configurable processor including an aggregate multiplier circuit for multiplying an X operand and a Y operand, the aggregate multiplier circuit comprising:
an array of TPU circuits, each TPU circuit residing at an intersection of a row of TPU circuits and a column of TPU circuits and configured to multiply a portion of a first operand and a portion of a second operand, the array comprising
a left-most column of TPU circuits configured to include the most significant bit of the X operand;
a right-most column of TPU circuits configured to provide a lower portion of a final result; and
a bottom-most row of TPU circuits configured to provide a upper portion of a final result,
wherein the upper portion of the final result is concatenated with lower portion of the final result to form an entire result, and each TPU is configurable to provide other functions in other modes, the other modes including a delay chain function and shift operation function.

28. A transitive processing unit ("TPU") circuit configurable to function as a part of an array of TPU circuits, the TPU circuit comprising:
a multiplier circuit comprising:
a first operand input for receiving a portion of a first operand and a second operand input for receiving a portion of a second operand, the multiplier circuit further configured to receive
at least a portion of a first immediate result generated by a first other TPU circuit if present in the array, and at least a portion of a first partial product from a second TPU circuit if present in the array, where the multiplier circuit generates at least a portion of a second immediate result and at least a portion of a second partial product; and
a pipeline circuit configured to temporally store the first operand input and the second operand input to produce the portion of the second immediate result and the portion of the second partial product at a specific point in time.

29. The TPU circuit of claim 28, wherein the first other TPU circuit is located to the left of the TPU circuit.

30. The TPU circuit of claim 28, wherein the second other TPU circuit is located above the TPU circuit.

31. The TPU circuit of claim 28, wherein the portion of the first operand is communicated to another pipeline circuit in a third other TPU circuit if present in the array.

32. The TPU circuit of claim 28, wherein the portion of the second operand input is communicated to another multiplier circuit in a fourth other TPU circuit if present in the array.

33. The TPU circuit of claim 28, wherein the portions of the first operand and the second operand are provided to the multiplier circuit at a first point in time.

34. The TPU circuit of claim 28, wherein the multiplier circuit is further configured to communicate the portion of the second immediate result to a fourth other TPU circuit, if present in the array.

35. The TPU circuit of claim 28, wherein the pipeline circuit is further configured to temporally store the portion of the second immediate result if the TPU circuit is a fourth other TPU circuit.

36. The TPU circuit of claim 35, wherein the pipeline circuit stores the portion of the second immediate result until a final result is generated.

37. The TPU circuit of claim 28, wherein the pipeline circuit is further configured to temporally store the portion of the second partial product result.

38. The TPU circuit of claim 37, wherein the pipeline circuit provides the portion of the second partial product to a third other TPU circuit, if present in the array.

39. The TPU circuit of claim 38, wherein the portion of the partial product is provided to the third other TPU circuit at a second point in time, where the third other TPU circuit is located below the TPU circuit.

40. The TPU circuit of claim 28, wherein the multiplier circuit is further comprises a first carry circuit to receive at least one first carry value for performing carry-look-ahead, if a fourth other TPU circuit is present in the array and is located to the right of the TPU circuit.

41. The TPU circuit of claim 28, wherein the pipeline circuit further comprises a second carry register for storing a second carry value, as generated by the multiplier circuit if the second other TPU circuit is present in the array.

42. The TPU circuit of claim 28, wherein the multiplier circuit further comprises at least one sign correction circuit configured to adjust the magnitude of a final result if at least one of the first operand and the second operand represents a signed, negative value.

43. The TPU circuit of claim 42, wherein the at least one sign correction circuit includes a sign detection circuit for determining if the most significant bit of one of the first operand and the second operand is a value indicating a negative number.

44. The TPU circuit of claim 42, wherein the at least one sign correction circuit is an x-signed correction circuit configured to subtract the portion of the first operand from a portion of the final result if the second operand represents a signed, negative value.

45. The TPU circuit of claim 42, wherein the at least one sign correction circuit is a y-signed correction circuit configured to subtract the portion of the second operand from a portion of the final result if the first operand represents a signed, negative value.

46. The TPU circuit of claim 28, wherein the TPU circuit is configured to operate as a delay chain circuit and the pipeline circuit is confignred to receive the portion of the second operand, which provides a value to be delayed by the delay chain circuit.

47. The TPU circuit of claim 28, wherein the TPU circuit is configured as a shifting circuit.

* * * * *